United States Patent
Ohinata et al.

(10) Patent No.: US 7,460,324 B2
(45) Date of Patent: Dec. 2, 2008

(54) HEAD AMPLIFIER CIRCUIT WITH FUNCTION FOR DEGAUSSING RESIDUAL MAGNETISM OF RECORDING HEAD

(75) Inventors: Yusuke Ohinata, Tachikawa (JP); Hiroyuki Naka, Ome (JP); Yuji Sakai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 11/215,020

(22) Filed: Aug. 31, 2005

(65) Prior Publication Data

US 2006/0139787 A1 Jun. 29, 2006

(30) Foreign Application Priority Data

Dec. 28, 2004 (JP) ............................. 2004-380301

(51) Int. Cl.
*G11B 5/03* (2006.01)
(52) U.S. Cl. ............................. 360/66; 360/46; 360/67; 360/68; 360/75
(58) Field of Classification Search ................... 360/46, 360/66, 75, 67–68
See application file for complete search history.

(56) References Cited

U.S. PATENT DOCUMENTS

| | | | | |
|---|---|---|---|---|
| 4,670,799 A | * | 6/1987 | Ogura et al. ................... | 360/66 |
| 4,821,127 A | * | 4/1989 | Soga et al. ..................... | 360/66 |
| 4,970,621 A | * | 11/1990 | Gailbreath et al. ........... | 361/149 |
| 5,168,395 A | * | 12/1992 | Klaassen et al. ............... | 360/46 |
| 5,181,058 A | | 1/1993 | Egawa | |
| 5,436,772 A | * | 7/1995 | Sekiya et al. .................. | 360/66 |
| 5,499,156 A | * | 3/1996 | Bentley ........................ | 361/150 |
| 5,963,385 A | * | 10/1999 | Takada et al. ................. | 360/31 |
| 6,038,093 A | * | 3/2000 | Takada et al. ................. | 360/66 |
| 6,256,176 B1 | | 7/2001 | Mao et al. | |
| 7,106,536 B2 | * | 9/2006 | Fang et al. ..................... | 360/67 |
| 2005/0190476 A1 | | 9/2005 | Wilson et al. | |
| 2005/0200997 A1 | * | 9/2005 | Cronch et al. ................. | 360/55 |

FOREIGN PATENT DOCUMENTS

| | | |
|---|---|---|
| JP | 59-213016 | 12/1984 |
| JP | 63-161512 | 7/1988 |
| JP | 63-244409 | 10/1988 |
| JP | 02-064903 A | 3/1990 |
| JP | 04-079003 | 3/1992 |

(Continued)

OTHER PUBLICATIONS

Australian Search Report dated Apr. 24, 2006 for Singapore Appln. No. 200505404-4.

(Continued)

*Primary Examiner*—Hoa T Nguyen
*Assistant Examiner*—Dismery Mercedes
(74) *Attorney, Agent, or Firm*—Pillsbury Winthrop Shaw Pittman, LLP

(57) ABSTRACT

In a data-recording mode, a driver circuit supplies a recording head with a recording current corresponding to write data. In a degaussing mode, the driver circuit supplies the recording head with a degaussing current for eliminating the residual magnetism of the head as the recording current. The degaussing current has a rising period and falling period set longer than those of the recording current supplied in the data-recording mode.

2 Claims, 6 Drawing Sheets

FOREIGN PATENT DOCUMENTS

| | | |
|---|---|---|
| JP | 04-228103 | 8/1992 |
| JP | 06-084113 A | 3/1994 |
| JP | 63-317917 | 12/1998 |
| JP | 11-086210 | 3/1999 |
| JP | 3191768 B2 | 7/2001 |
| JP | 2005-293726 | 10/2005 |

OTHER PUBLICATIONS

Chinese Office Action dated Jun. 8, 2007 for Appln. No. 200510098848.3.

* cited by examiner

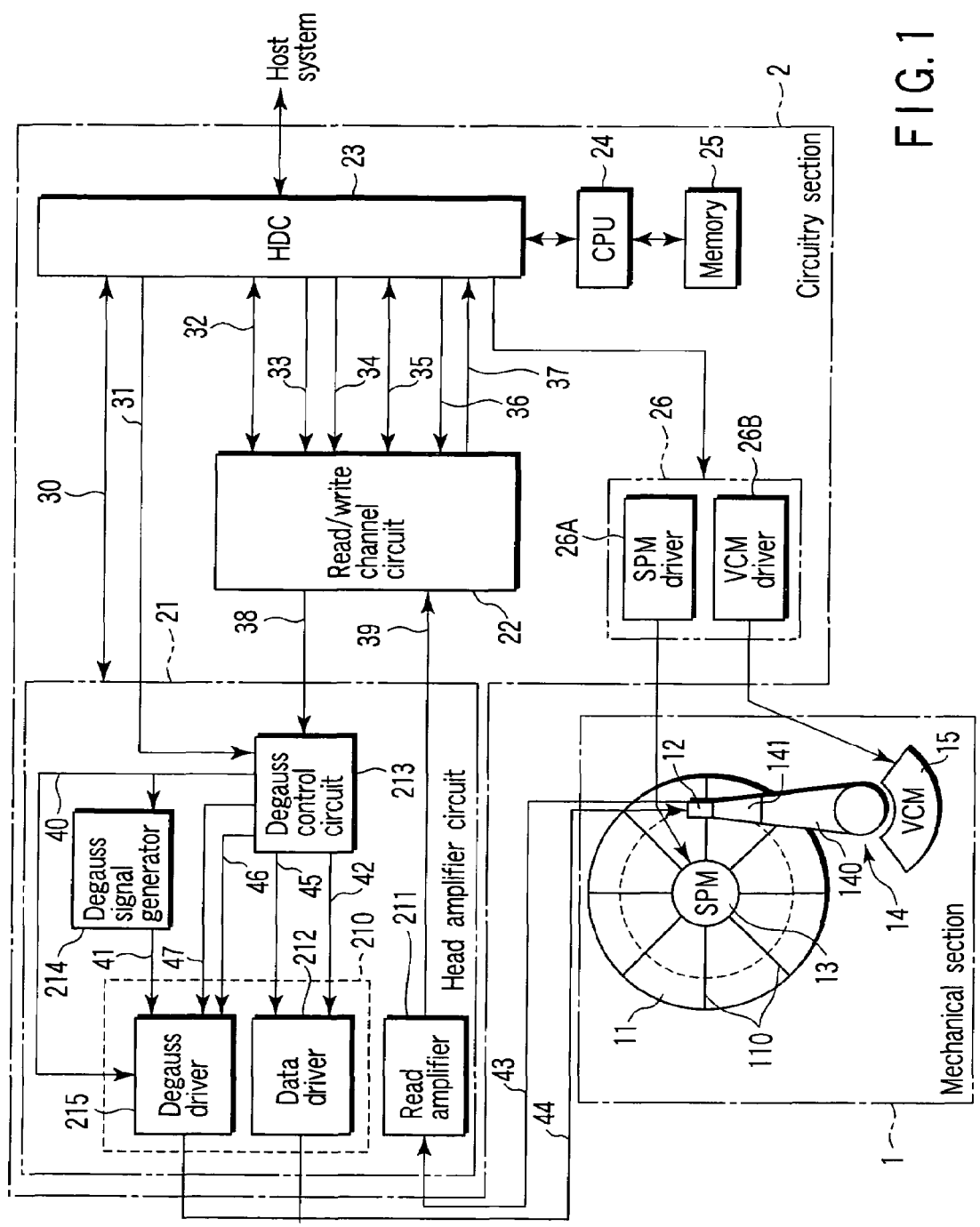
F I G. 1

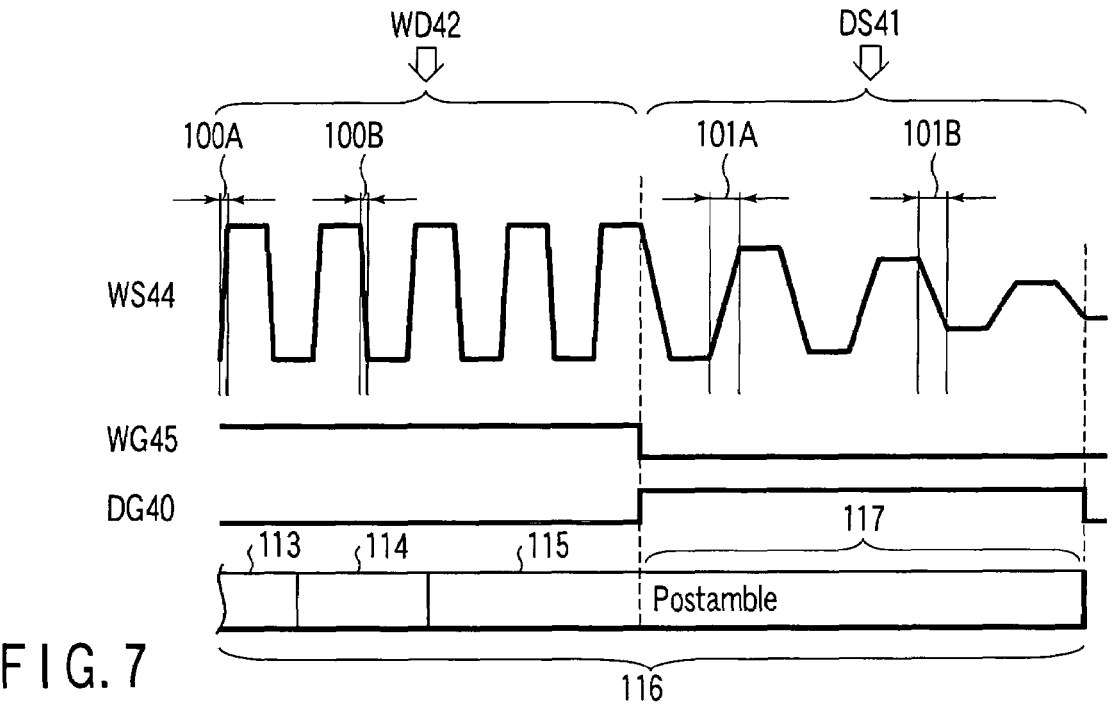
F I G. 7
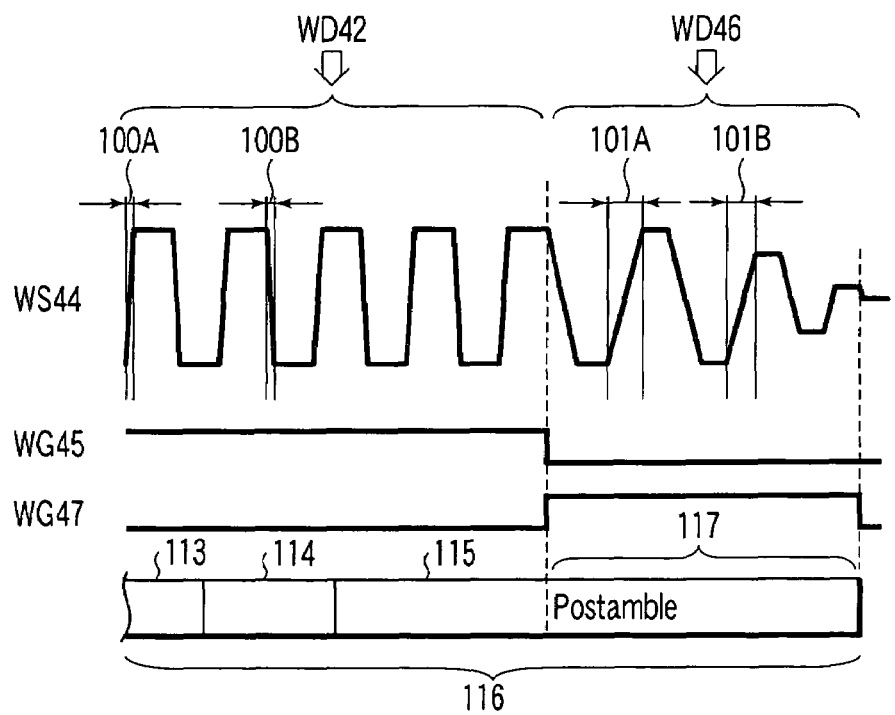
F I G. 8

HEAD AMPLIFIER CIRCUIT WITH FUNCTION FOR DEGAUSSING RESIDUAL MAGNETISM OF RECORDING HEAD

CROSS-REFERENCE TO RELATED APPLICATIONS

This application is based upon and claims the benefit of priority from prior Japanese Patent Application No. 2004-380301, filed Dec. 28, 2004, the entire contents of which are incorporated herein by reference.

BACKGROUND OF THE INVENTION

1. Field of the Invention

The present invention relates to a hard disk drive with a recording head, and more particularly to a head amplifier circuit suitable for eliminating the residual magnetism of a recording head, and a hard disk drive with the head amplifier circuit.

2. Description of the Related Art

In hard disk drives, data is written to a disk medium by supplying their recording heads with write currents (recording currents) corresponding to write data. When a write current is supplied to a recording head, a recording magnetic field occurs at the head. This magnetic field permits magnetic recording (write operation) corresponding to write data to be performed on a disk medium.

The supply of the recording current to the recording head is stopped after a write operation is performed. At this time, it is known that a magnetic domain may well remain at the recording head, i.e., the recording head may be magnetized. When data is recorded on one or several data sectors of a magnetic disk medium by the recording head, and then the above phenomenon has occurred, all or part of the data or servo data recorded on the data sector and sectors subsequent to the data sector may be erased.

To avoid this, techniques for eliminating the residual magnetism of a recording head have been proposed. For instance, Jpn. Pat. Appln. KOKAI Publication No. 2-64903 (document 1) describes a technique for supplying a recording head with a recording current of a constant frequency as a degaussing current immediately after a write operation of the recording head. The supply of the degaussing current prevents the recording head from remaining magnetized. The time immediately after a write operation specifically means the time immediately after the write gate (write gate signal) is turned off. The recording current of a constant frequency (degaussing current) is generated based on dummy write data. The degaussing current is characterized in that its amplitude gradually attenuates.

Further, Jpn. Pat. Appln. KOKAI Publication No. 4-228103 (document 2) describes a technique for monotonically decreasing a recording current, supplied to a recording head, for a preset period (characteristic relaxation period) immediately after the write gate is turned off. In this case, the recording current is attenuated along a preset inclination or decay index curve, thereby preventing the recording head from remaining magnetized. Namely, document 2 describes a technique for preventing a recording head from being kept magnetized. Document 2 also describes supply, for the preset period, of a recording current of a higher frequency than in a data write operation. This high-frequency recording current is attenuated so that the envelop curve of the amplitude is monotonically decreased.

The techniques (hereinafter referred to as prior art) described in documents 1 and 2 both aim to eliminate the residual magnetism of the recording head by recording read-unnecessary data as the rear end of predetermined write data while gradually attenuating the recording current. In particular, document 1 discloses (1) frequency, (2) period for attenuation and (3) attenuation configuration used as parameters for attenuating the recording current. Attenuation of the recording current using optimal parameters may reliably eliminate the residual magnetism of the recording head.

However, it has become clear that the prior art cannot completely eliminate the residual magnetism of recent magnetic heads for high-density recording. Moreover, the time required to attenuate the recording current is about ten to several hundred nanoseconds. In the prior art, unnecessary data is recorded on an area of the magnetic disk medium corresponding to this time. By the unnecessary data, the formatting efficiency of the magnetic disk medium is reduced.

BRIEF SUMMARY OF THE INVENTION

In accordance with an embodiment of the invention, there is provided a head amplifier circuit for use in a hard disk drive having a recording head which magnetically records data on a magnetic disk medium. The head amplifier circuit comprises a driver circuit configured to supply, in a data-recording mode, the recording head with a recording current corresponding to write data and serving as a first recording current, and to supply, in a degaussing mode, the recording head with a degaussing current serving as a second recording current. The second recording current has a rising period and falling period set longer than a rising period and falling period of the first recording current. The head amplifier also comprises a control circuit configured to control switching from the data-recording mode to the degaussing mode to control the driver circuit.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram illustrating the configuration of a hard disk drive according to an embodiment of the invention;

FIG. 7 is a timing chart illustrating, in relation to a data format, the relationship between WS 44, WG 45 and DG 40 in a second modification of the embodiment;

FIG. 8 is a timing chart illustrating, in relation to a data format, the relationship between WS 44, WG 45 and WG 47 in a third modification of the embodiment;

DETAILED DESCRIPTION OF THE INVENTION

Figure 2:
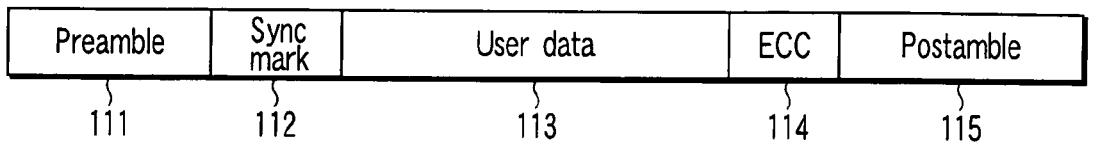
FIG. 2 is a view illustrating a data sector format employed in the embodiment.

An embodiment of the invention will be described with reference to the accompanying drawings. FIG. 1 is a block diagram illustrating the configuration of a hard disk drive according to an embodiment of the invention. The hard disk drive (hereinafter referred to as the "HDD") mainly comprises a mechanical section 1 and circuitry section 2.

The mechanical section 1 includes a magnetic disk (magnetic disk medium) 11, magnetic head 12, spindle motor (SPM) 13 and actuator 14. The disk 11 has two disk surfaces, namely, upper and lower surfaces. At least one of the two disk surfaces, e.g., the upper disk surface, serves as a recording surface on which data is magnetically recorded. On the recording surface of the disk 11, a plurality of servo areas 110 radially extend at regular circumferential intervals. Each servo area 110 has servo data (SD) recorded thereon. The servo data includes position data necessary for control (seek/poisoning control) for positioning the head 12 to a target position on a target track. A user data area is provided between adjacent servo areas 110, and includes a plurality of data sectors. A number of concentric tracks (not shown) are provided on the recording surface of the disk 11.

FIG. 2 illustrates a general format (data sector format) example of write data of one data sector recorded on the disk 11. As shown in FIG. 2, write data of one data sector comprises a preamble 111, sync mark (SM) 112, user data 113, error correction code (ECC) 114 and postamble 115. The preamble 111 is data (preamble data) formed of a synchronization pattern of a preset frequency, and is used for auto gain control (AGC) for a synchronous signal used to generate a clock signal, and for a read signal. The sync mark 112 is an identification pattern (particular code) for detecting the leading bit of the following user data 113 during reproduction. The user data 113 is coded data. The ECC 114 is used to correct an error in the reproduced user data 113. The postamble 115 is data added to finish maximum likelihood determination (ML determination). The ML determination is performed to decode the user data 113 by a partial response maximum likelihood process (PRML process).

Referring again to FIG. 1, the head 12 is located corresponding to the recording surface of the disk 11. The head 12 is a composite head including a recording head (write head) used to record (write) data to the disk 11, and a reproducing head (read head) used to reproduce (read) data from the disk 11. For simplification, FIG. 1 only shows one head 12. In general, however, the two surfaces of the disk 11 both serve as recording surfaces, and heads are provided for both disk surfaces. Further, in the HDD shown in FIG. 1, only a single disk 11 is employed. However, the invention is also applicable to an HDD with a plurality of disks 11 stacked on each other.

The SPM 13 rotates the disk 11 at high speed. The head 12 is attached to the tip of the actuator 14. More specifically, the head 12 is attached to a suspension 141 extending from an arm 140 incorporated in the actuator 14. The actuator 14 includes a voice coil motor (VCM) 15 for driving the actuator 14. The actuator 14 radially moves the head 12 over the disk 11 under the servo control of a microprocessor (CPU) 24 described later, thereby positioning the head 12 at a target position (target track) on the disk 11.

The circuitry section 2 comprises a head amplifier circuit 21, read/write channel circuit 22, hard disk controller (HDC) 23, CPU 24, memory 25 and motor driver 26. These days, it has been generalized to incorporate several of the circuits of an HDD in a single IC chip. Also in the embodiment, several of the head amplifier circuit 21, read/write channel circuit 22, HDC 23, CPU 24, memory 25 and motor driver 26 may be incorporated in one IC chip.

The head amplifier 21 includes a read amplifier 211 and data write driver 212. The read amplifier 211 amplifies a signal (reproduction signal) 43 reproduced (read) by the head 12, and outputs the amplified signal as a read signal (RS) 39. The data write driver 212 converts write data (WD) 42 into a recording current (write current) signal (WS) 44 when a write gate signal (WG) 45 is active (e.g. at high level). Namely, the data write driver 212 generates WS 44 corresponding to WD 42 when WG is active. The head amplifier circuit 21 further includes a degauss control circuit 213, degauss signal generator 214 and degauss write driver 215, which will be described later.

The read/write channel circuit 22 is a signal-processing circuit for performing various signal processes, such as analog-to-digital conversion on RS (read signal) 39, encoding on WD (write data) 35, and decoding of read data. Particulars concerning the operation of the read/write channel circuit 22 will be descried later.

The HDC 23 serves as an interface between the HDD and a host system (not shown). The host system is an electronic device, such as a personal computer, which utilizes the HDD of FIG. 1 as a storage device. The HDC 23 controls transfer of user data (read/write data) between the HDD and the host system. Further, the HDC 23 controls the read/write process by the read/write channel circuit 22 via a bi-directional control signal line (RWC_CTL) 32 that generally consists of a bus interface (I/F). Further, the HDC 23 transmits write data (WD) 35 having a predetermined format to the read/write channel circuit 22 in synchronism with a write gate signal (WG) 33, and receives read data (RD) 35 from the read/write channel circuit 22 in synchronism with a read gate signal (RG) 34.

Figure 3:
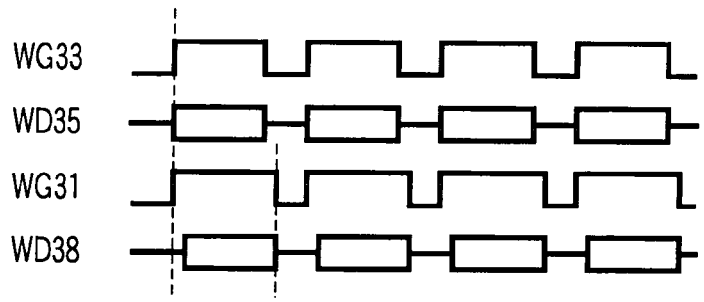
FIG. 3 is a timing chart illustrating the relationship between a write gate signal (WG) 33, write data (WD) 35, WG 31 and WD 38 in the embodiment.

Furthermore, the HDC 23 controls the read/write operation of the head amplifier circuit 21 via a bi-directional control signal (AMP_CTL) 30 that generally consists of a serial I/F, and outputs WG (write gate signal) 31 to the head amplifier circuit 21. WG 31 is output together with WG 33. WG 31 is a gate signal adjusted in timing so that it is synchronized with WD (write data) 38 output from the read/write channel circuit 22. When WG 31 is active (e.g. at high level), it designates a data-recording mode for the head amplifier circuit 21. When the read/write channel circuit 22 has received WG 33 and WD 35 from the HDC 23, it outputs WD 38. In this embodiment, WD 38 is output in a preset format, lagging WG 33 and WD 35 by a certain amount. The timing chart of FIG. 3 shows the relationship between WG 33, WD 35, WG 31 and WD 38.

The HDC 23 outputs a servo gate (SG) 36 to the read/write channel circuit 22. SG 36 is a timing signal (servo gate signal) corresponding to each servo area 110 on the disk 11. From SG 36, the HDC 23 receives servo data (SD) 37 for head positioning that is acquired by decoding RS (reproduction signal) 39 by the read/write channel circuit 22.

The CPU 24 is a main controller for the HDD, and is a main element incorporated in a servo system for executing control (servo control) for positioning the head 12. Based on SD (servo data) 37, the CPU 24 controls a seek operation (track following operation) for moving the head 12 to a target track on the disk 11. To this end, the CPU 24 controls the input value (control voltage value) of a VCM driver 26B to thereby control the VCM 15 of the actuator 14. The memory 25 includes a RAM, ROM and flash EEPROM (electrically erasable and programmable read only memory), and stores a control program for the CPU 24 and various types of control data. The motor driver 26 includes a SPM driver 26A and VCM driver 26B. The SPM driver 26A drives the SPM 13 under the control of the CPU 24. The VCM driver 26B drives the VCM 15 under the control of the CPU 24.

As described above, the head amplifier circuit 21 includes the degauss control circuit 213, degauss signal generator 214 and degauss write driver 215, in addition to the read amplifier 211 and data write driver 212. The degauss control circuit 213 outputs WG (write gate signal) 45 to the data write driver 212 in synchronism with WG (write gate signal) 31 output from the HDC 23. WG 45 is used to control the output of WS (recording current signal) 44 by the date write driver 212 to the magnetic head 12. When outputting WG 45, the degauss control circuit 213 supplies the data write driver 212 with WD (write data) 42 corresponding to WD 38 output from the read/write channel circuit 22.

The degauss control circuit 213 also outputs WG (write gate signal) 47 to the degauss write driver 215 in synchronism with WG 31. WG 47 is used to control the output of WS 44 by the degauss write driver 215 to the magnetic head 12. When outputting WG 47, the degauss control circuit 213 supplies the degauss write driver 215 with WD (write data) 46. When WG 31 is switched from the active state to the inactive state, the degauss control circuit 213 outputs a degauss gate signal (DG) 40 to the degauss signal generator 214. When DG 40 is active, it designates a degauss mode for eliminating the residual magnetism of the magnetic head 12. DG 40 is also used to control the generation of a degauss (magnetic field eliminating) signal (DS) 41, and the generation of a recording current for degaussing based on DS 41 by the degauss write driver 215. WG 45, WG 47 and DG 40 are exclusively output, namely, not simultaneously output. Accordingly, WD 42, WD 46 and DS 41 are also exclusively output and not simultaneously output. Therefore, WS 44 supplied to the head 12 always corresponds to only one of the signals WD 42, WD 46 and DS 41.

The degauss signal generator 214 generates DS (degauss signal) 41 as a degaussing data signal for eliminating the residual magnetism of the head 12, when a degauss mode (in which DG 40 is active (e.g., at high level)) is assumed. The degauss write driver 215 is a write driver for degaussing the head 12. When DG 40 or WG 47 is active (e.g., at high level), the degauss write driver 215 converts DS 41 or WD 46 into WS 44, i.e., generates WS 44 from DS 41 or WD 46. The degauss write driver 215 and data write driver 212 provide a driver circuit 210 for outputting WS 44 to the head 12. The degauss write driver 215 and data write driver 212 differ from each other in that WSs (recording current signal) 44 output therefrom differ in rising and falling characteristics. The rising and falling characteristics of WS 44 will be described in detail later.

Figure 11:
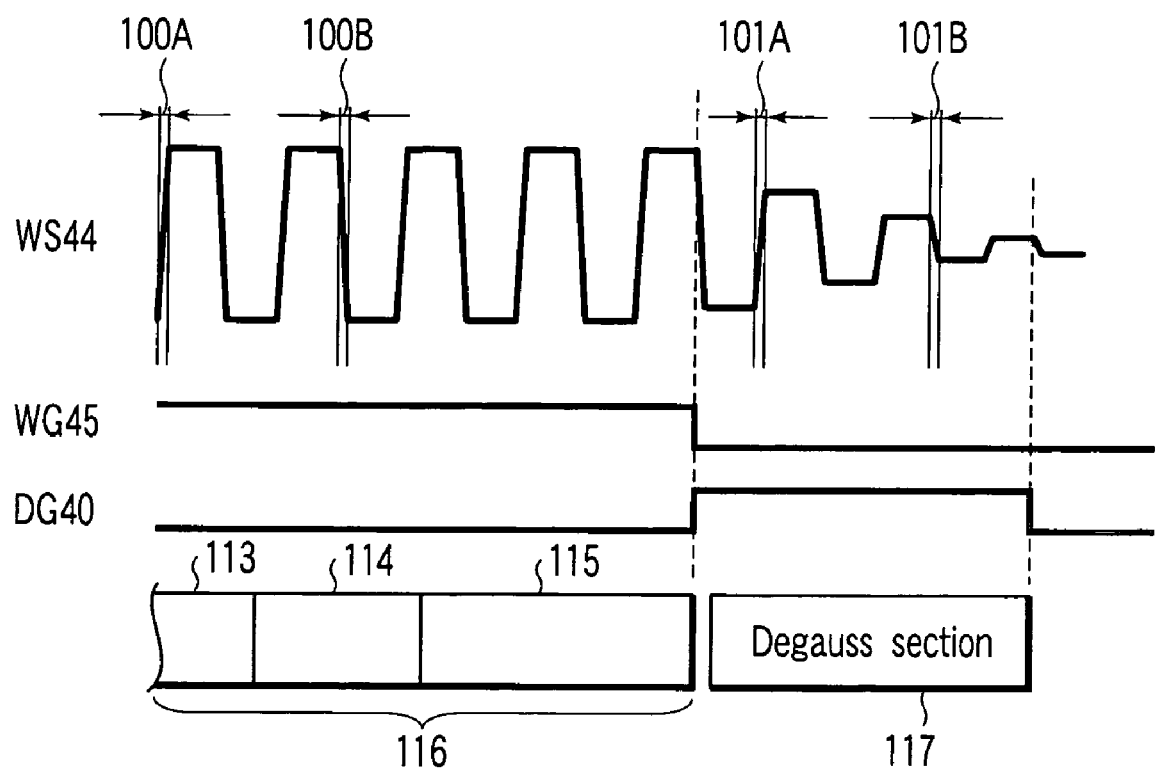
FIG. 11 is a timing chart illustrating, in relation to a data format, the relationship between WS 44, WG 45 and DG 40, acquired assuming that degauss control is performed by the prior art.

FIG. 11 is a timing chart illustrating, in relation to a data format, the relationship between WS 44, WG 45 and DG 40, acquired assuming for reference that degauss control is performed by the prior art in the HDD of FIG. 1. In this case, it is presupposed that the write data format shown in FIG. 2 is used. In FIG. 11, for facilitating drawing, the signal waveform of WS 44 corresponding to a write data section 116 is expressed as a pattern in which a single-frequency signal is repeated. Actually, however, the user data 113 and ECC 114 in the write data section 116 are recorded in a randomized pattern different from a simple repeated pattern.

General head amplifier circuits have only one write driver. Therefore, the rising period (Tr) 100A and falling period (Tf) 100B of WS 44 corresponding to the write data section 116, and the rising period (Tr) 101A and falling period (Tf) 101B of WS 44 corresponding to a degauss section 117 are all identical to each other. In the prior art, the waveform parameters for the degauss section 117 mainly include frequency, current attenuation configuration and/or period for attenuation. However, these parameters are not sufficient to degauss the head 12. It is possible that a magnetic flux will be generated from the head 12 toward the disk 11 even after the end of the degaussing process, thereby erasing information already recorded on the disk 11 (this is called erasure during non-recording).

The inventors of the present application have found that the head 12 can be further reliably degaussed by controlling the rising period 101A and falling period 101B of a recording current waveform. For this control, the head amplifier circuit 21 of the embodiment employs the degauss write driver 215 for degaussing, in addition to the data write driver 212. The degauss write driver 215 is configured to output, as WS 44, WS (a degaussing current signal as a second recording current signal) having rising and falling characteristics different from those of WS (first recording current signal) output from the data write driver 212. Specifically, the degauss write driver 215 outputs a write current signal having a longer rising period (Tr) and falling period (Tf) than a write current signal output from the data write driver 212. This enables a higher degauss effect than that of the prior art to be acquired. Theoretically, it is understood that the magnetization directions of some of the small magnetic domains of a magnetic pole cannot return to the easy axis if the rising/falling period of a recording current waveform is too short. This is the cause of erasure during non-recording. The control itself of the rising/falling periods of a signal can be easily realized by a well-known technique.

Figure 4:
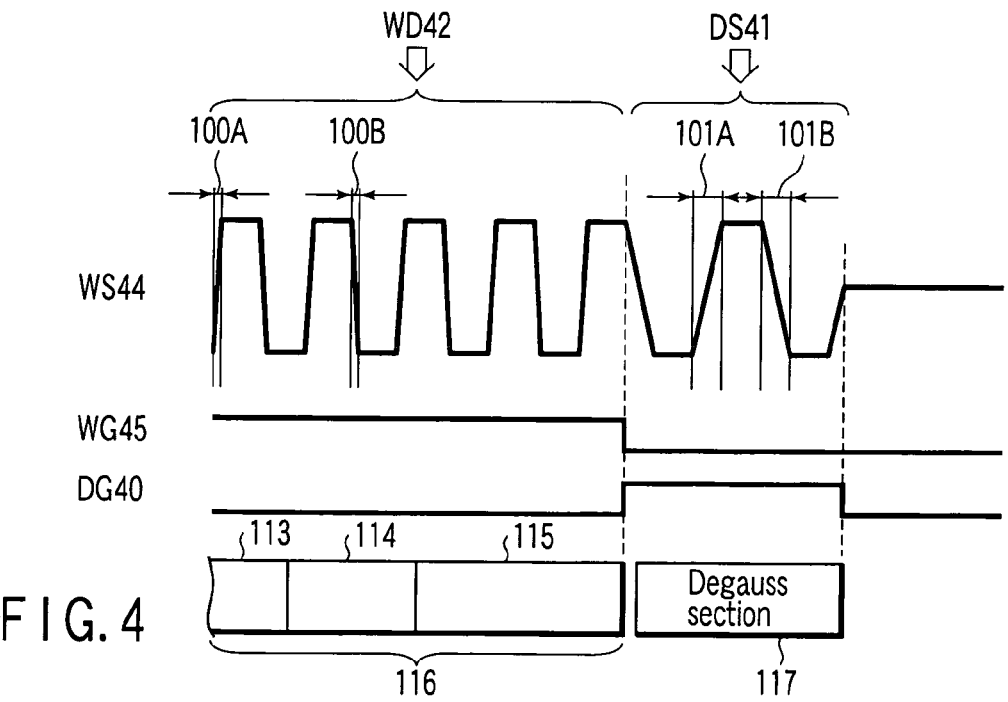
FIG. 4 is a timing chart illustrating, in relation to a data format, the relationship between a recording current signal (WS) 44, WG 45 and degauss gate signal (DG) 40 in the embodiment.

Referring now to FIG. 4, the operation of the embodiment will be described. FIG. 4 is a timing chart illustrating, in relation to a data format, the relationship between WS (recording current signal) 44, WG (write gate signal) 45 and DG (degauss gate signal) 40. When controlling the write process by the read/write channel circuit 22 via the RWC_CTL (bi-directional control signal line) 32, the HDC 23 outputs WG (write gate signal) 33 and WG 31 to the channel circuit 22 and head amplifier circuit 21, respectively. Further, the HDC 23 generates WD (write data) 35 including user data transferred from the host system, and outputs it to the read/write channel circuit 22 in synchronism with WG 33.

The read/write channel circuit 22 encodes WD 35 output from HDC 23, and outputs the resultant data as WD 38 to the head amplifier circuit 21. The data format of WD 38 is identical to that shown in FIG. 2, and comprises a preamble 111, sync mark 112, user data 113, ECC 114 and postamble 115. WG 31 output from the HDC 23 to the head amplifier circuit 21 is adjusted so that its falling timing is synchronized with the end timing of WD 38 output from the read/write channel circuit 22 to the head amplifier circuit 21, as described above.

The degauss control circuit 213 of the head amplifier circuit 21 outputs WG 45 to the data write driver 212 in synchronism with WG 31 output from HDC 23. As a result, when the setting of a data-recording mode is designated by WG 31 in the head amplifier circuit 21, the setting of a data-recording mode is designated by WG 45 in the data write driver 212.

Further, the degauss control circuit 213 outputs WD 42, corresponding to WD 39 output from the read/write channel circuit 22, to the data write driver 212 in accordance with the output of WG 45.

Figure 10:
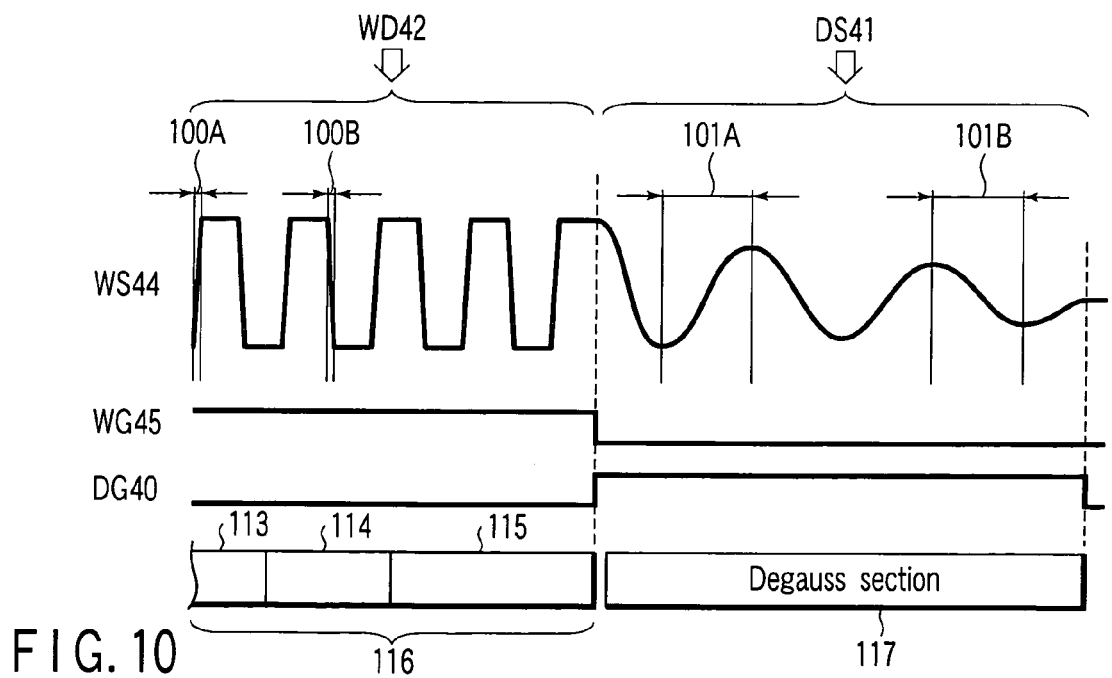
FIG. 10 is a timing chart illustrating, in relation to a data format, the relationship between WS 44, WG 45 and DG 40 in a fifth modification of the embodiment.

The data write driver 212 operates when WG 45 output from the degauss control circuit 213 is active, (in the embodiment, at high level), thereby converting WD 45 from the circuit 213 into WS (recording current signal) 44. WS 44 is sent to the recording head incorporated in the magnetic head 12. As a result, in the data-recording mode in which WG 45 is active, write data corresponding to WS 44 (WD 45) is recorded on the disk 11 by the recording head as the data of the write data section 116, as is shown in FIG. 10.

The rising period (Tr) 100A and falling period (Tf) 100B of WS (first recording current signal) 44 when WG 45 is active are identical to, for example, the rising period (Tr) 101A or 101A and falling period (Tf) 100B or 101B of WS 44 employed in the prior art shown in FIG. 11, respectively. In the embodiment, assume that the rising period (Tr) and falling period (Tf) of WS 44 are defined as the period ranging between the time when the amplitude of WS 44 is 10% of the maximum amplitude and the time when the amplitude of WS 44 is 90% of the maximum amplitude. However, in FIGS. 4 and 6 to 10, for simplification of the drawings, the period ranging between the time when the amplitude of WS 44 is 0% of the maximum amplitude and the time when the amplitude of WS 44 is 100% of the maximum amplitude is set as Tr and Tf of WS 44. The same can be said of FIGS. 6-10 described later.

Assume here that WG 31 output from the HDC 23 is shifted from high level to low level, namely, from the active state (which designates the data recording mode) to the inactive state. At this time, the degauss control circuit 213 switches the state of DG (degauss gate signal) 40 from the inactive state (e.g. low level) to the active state (e.g., high level) that designates the degauss mode. DG 40 is sent from the degauss control circuit 213 to the degauss signal generator 214 and degauss write driver 215. DG 40 is kept in the active state for a certain period by the degauss control circuit 213. The CPU 24 may designate the period in which DG 40 is kept active, and inform the degauss control circuit 213 of it via the HDC 23 and AMP_CTL 30, in accordance with a command from the host system made by a user operation.

The degauss signal generator 214 generates DS (degauss signal) 41, used to eliminate the residual magnetism of the head 12, in the degauss mode in which DG 40 output from the degauss control circuit 213 is active. DS 41 is sent from the degauss signal generator 214 to the degauss write driver 215. The degauss write driver 215 operates in the degauss mode in which DG 40 is active, thereby converting DS 41 from the degauss signal generator 214 into WS (recording current signal) 44. Note that the rising period (Tr) 101A and falling period (Tf) 101B of WS (degaussing current signal as the second recording current signal) 44 when the DG 40 is active are longer than the rising periods (Tr) 100A and 101A and falling periods (Tf) 100B and 101B of WS 44 employed in the prior art shown in FIG. 11.

In general, the rising period (Tr) 100A and falling period (Tf) 100B of a recent recording current are about 1 ns, assuming that the rising/falling periods range between the time when the amplitude of the current is 10% of the maximum amplitude and the time when the amplitude is 90% of the maximum amplitude. In contrast, in the embodiment, Tr 101A and Tf 101B of WS 44 output from the degauss write driver 215 when DG 40 is active are longer than Tr 100A and Tr 100B (and Tr 101A and Tf 101B in the prior art), and are set to, for example, 1 ns to 10 ns.

As will be described later, in light of the elimination of the residual magnetism of the head 12, the longer Tr 101A and Tf 101B, the further advantageous. The reason why an upper limit is, nevertheless, set for Tr 101A and Tf 101B lies in the following: Firstly, if Tr 101A and Tf 101B are set longer than necessary, the formatting efficiency of the disk 11 is degraded. Moreover, the effect of eliminating the residual magnetism does not proportionally increase as Tr 101A and Tf 101B increase. After a certain period elapses, the effect does not significantly change. Accordingly, from the viewpoint of formatting efficiency, it is preferable not to set Tr 101A and Tf 101B too much longer than Tr 100A and Tf 100B.

WS (recording current signal) 44, into which DS 41 is converted by the degauss write driver 215 when DG 40 is active, is sent to the recording head of the magnetic head 12. WS 44 is then recorded on the disk 11 by the recording head as the data of the degauss section 117 subsequent to the write data section 116 as shown in FIG. 4, while DG 40 is active. Thus, in the degaussing mode in which DG 40 is active, data corresponding to the degauss section 117 is recorded on the disk 11 by the recording head in accordance with WS (recording current signal) 44 corresponding to DS 41.

In the embodiment, the frequency of WS 44 is set to, for example, 100 MHz (one cycle is 10 ns) when DG 40 is active. Further, the period in which DG 40 is active is set to a multiple of the cycle of WS 44 during the period, for example, twice the cycle of WS 44 (i.e., 20 ns). In this case, while DG 40 is active, data corresponding to WS 40 of 100 MHz is recorded on the disk 11 as two-cycle data contained in the degauss section 117. Tr 101A and Tf 101B of WS 44 when DG 40 is active are set to 1 to 10 ns, which is longer than Tr 100A and Tf 100B of WS 44 assumed when DG 40 is inactive.

By recording, based on WS 44, data corresponding to the degauss section 117 when DG 40 is active, the magnetization direction of each small magnetic domain of the magnetic pole of the recording head can be easily aligned with the easy axis when this recording process is finished. Accordingly, in the embodiment, a write operation performed in the data recording mode previous to the degaussing mode enables the residual magnetism of the head 12 to be efficiently eliminated, i.e., enhances the degaussing effect. Concerning the recording frequency of the degauss section 117, it is necessary to set one cycle not less than the sum of Tr 101A and Tf 101B.

Figure 5:
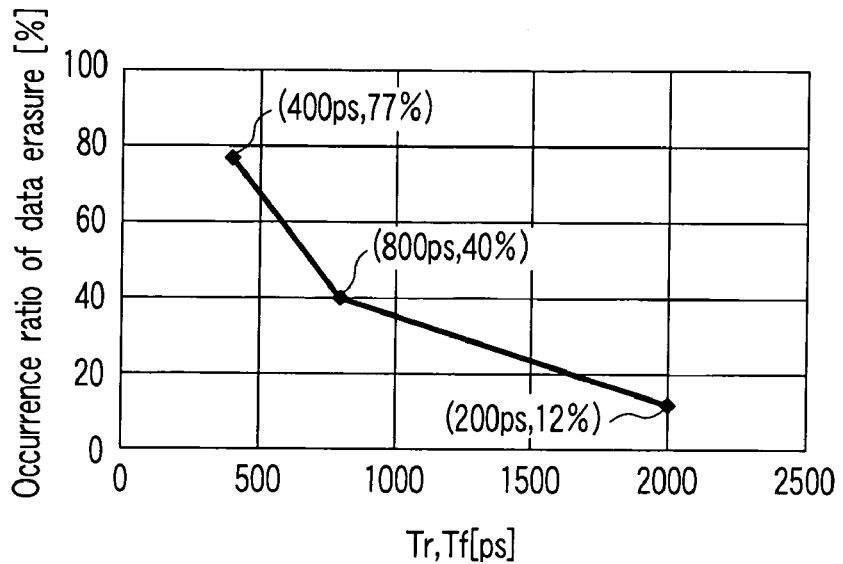
FIG. 5 is a graph illustrating the occurrence ratio of recording data erasure in units of rising periods (Tr) 101A and falling periods (Tf) 101B of WS (recording current signal)

Referring to FIG. 5, the degaussing effect will be described. The inventors of the present application have detected the frequency of a recording data erasure phenomenon, caused by the residual magnetism of the recording head, in units of periods Tr and Tf of WS 44 by varying the periods Tr and Tf. FIG. 5 is a graph illustrating the occurrence ratio of recorded-data erasure in units of periods Tr and Tf. As is apparent from FIG. 5, the longer Tr and Tf, the lower the occurrence ratio of recording data erasure. This means that the longer Tr and Tf, the higher the effect of eliminating the residual magnetism of the recording head. However, note that when Tr and Tf are set to a certain length or more, a reduction in the occurrence ratio of recording data erasure is reduced. Therefore, as described above, it is not necessary to set Tr and Tf too much long. Thus, the embodiment can further enhance the conventional effect of suppressing recording performed by the residual magnetism of the recording head during a non-recording period. Further, in the embodiment, the same or better advantage as or than in the prior art can be acquired, thereby preventing a reduction in formatting efficiency, even if the period for attenuation is set to a value less than about 50 ns, which is required in the prior art.

In the embodiment, to easily switch the mode from the data-recording mode to the degaussing mode, two write drivers of different rising/falling characteristics, i.e., the data write driver 212 and degauss write driver 215, are used to supply WS 44 to the magnetic head 12. However, a single write driver can be used instead of the data write driver 212 and degauss write driver 215. In this case, it is sufficient if the single write driver can quickly switch the rising/falling characteristics of WS 44 when WG 45 is switched from the active state to the inactive state.

FIRST MODIFICATION

Figure 6:
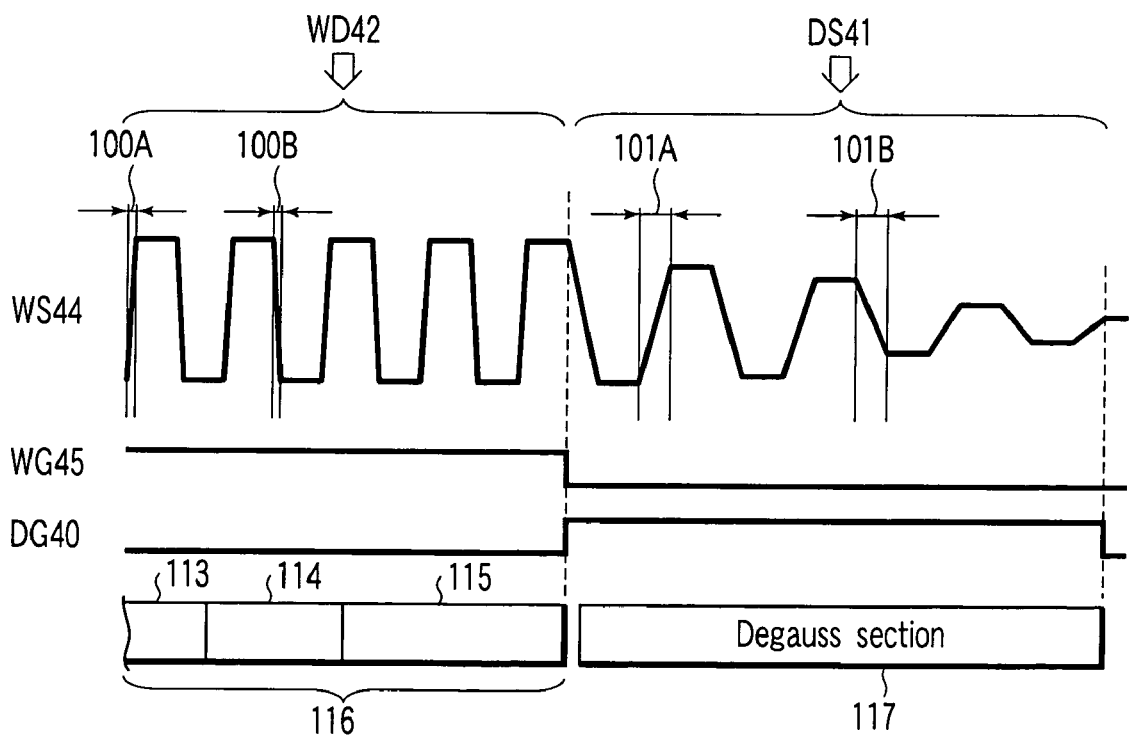
FIG. 6 is a timing chart illustrating, in relation to a data format, the relationship between WS 44, WG 45 and DG 40 in a first modification of the embodiment.

Referring to FIG. 6, a first modification of the above-described embodiment will be described. FIG. 6 is a timing chart similar to FIG. 4, in which the relationship between WS 44, WG 45 and DG 40 is shown in relation to a data format. In the above embodiment, WS 44 has a constant amplitude when the DG 40 is active. In contrast, in the first modification, WS 44 when DG 40 is active (i.e., WS 44 corresponding to DS 41) has an amplitude envelope shape in which the amplitude is linearly or exponential functionally monotonically decreased. In this modification, Tr 101A and Tf 101B of WS 44 when DG 40 is active are set longer than Tr 100A and Tf 100B of WS 44 corresponding to WD 45, as in the above embodiment.

That is, the first modification is acquired by combining the above embodiment with one parameter "attenuation configuration", which is included in the parameters—(1) frequency, (2) period for attenuation and (3) attenuation configuration—employed in the prior art for attenuating the recording current to enhance the effect of degaussing the recording head. The first modification better enhances the degaussing effect than the embodiment, by virtue of the features of WS 44 when DG 40 is active. WS 44 is characterized in that Tr 101A and Tf 101B are longer than Tr 100A and Tf 100B, and that the amplitude of WS 44 indicated by the amplitude envelope shape is monotonically decreased. It is a matter of course that the above embodiment can be combined with a parameter, such as "frequency", other than the above-mentioned one, i.e., the attenuation shape of WS 44 when DG 40 is active. In the example of FIG. 6, when DG 40 is active, four-cycle data corresponding to WS 44 of 100 MHz is recorded on the disk 11 as the data of the degauss section 117.

In the above-described embodiment and first modification, when WG 31 is active, the degauss control circuit 213 outputs WD 42 to the data write driver 212. As a result, when WG 31 is active, WS 44 corresponding to WD 42 is sent to the magnetic head 12. When WG 31 becomes inactive, DG 40 is switched to the active state by the degauss control circuit 213. At this time, the degauss signal generator 214 sends degauss signal DS 41 to the degauss write driver 215. As a result, when DG 40 is active, WS 44 corresponding DS41 is sent to the magnetic head 12. As described above, in the embodiment and first modification, when DG 40 is active, WS 44 is generated based on DS 41 generated by the degauss signal generator 214 independently of WD (write data) 42. Using WS 44 based on DS41, data corresponding to the degauss section 117 is recorded.

SECOND MODIFICATION

Referring then to FIG. 7, a second modification of the embodiment will be described. FIG. 7 is a timing chart similar to FIG. 6, in which the relationship between WS 44, WG 45 and DG 40 is shown in relation to a data format. The second modification is characterized in that part of the end portion of the postamble 115 in the write data section 116 is used as the degauss section 117. Therefore, in the second modification, WG 31 is switched by the HDC 23 from the active state to the inactive state at some portion of the postamble 115. In synchronism with the switching of WG 31, DG 40 is switched by the degauss control circuit 213 from the inactive state to the active state at some portion of the postamble 115. Simultaneously, WG 45 is switched by the degauss control circuit 213 from the active state to the inactive state at some portion of the postamble 115. DG 40 is switched to the inactive state at the end of the postamble 115.

As a result, when WG 45 is active, data corresponding to the area ranging from the start of the write data section 116 to some portion of the postamble 115 of the write data section 116 is recorded in accordance with WS 44 generated from WD 42 by the data write driver 212. When WG 45 is switched to the inactive state, and DG 40 is switched to the active state, data is recorded in the following manner. Namely, in accordance with WS 44 generated from DS 41 by the degauss write driver 215, data corresponding to the area ranging from some portion to the end of the postamble 115 of the write data section 116 is recorded as the data of the degauss section 117.

Tr 101A and Tf 101B of WS 44 corresponding to the degauss section 117 in the postamble 115 are set longer than Tr 100A and Tf 100B by the degauss write driver 215. Accordingly, also in the second modification, the residual magnetism of the head 12 can be efficiently eliminated. Moreover, since in the second modification, the degauss section 117 is included in the postamble 115, it is not necessary to add the independent degauss section 117 after the postamble 115 (write data section 116), which differs from the first modification. As a result, the second modification further enhances the formatting efficiency of the disk 11.

THIRD EMBODIMENT

Referring to FIG. 8, a third modification of the embodiment will be described. FIG. 8 is a timing chart illustrating the relationship between WS 44, WG 45 and WG 47 in relation to a data format. Like the second modification, the third modification is characterized in that part of the end portion of the postamble 115 in the write data section 116 is used as the degauss section 117. The third modification differs from the second modification in that in the former, the data write driver 212 and degauss write driver 215 generate WS 44 using WD 42 and WD 46 corresponding to WD 38 output from the read/write channel circuit 22 to the degauss control circuit 213, respectively.

Accordingly, in the third modification, when WG 31 is switched from the active state to the inactive state by the HDC 23 at some portion of the postamble 115, not only WG 45 but also WG 47 are controlled by the degauss control circuit 213. Specifically, the degauss control circuit 213 simultaneously switches WG 45 and WG 47 to the inactive state and the active state, respectively, in synchronism with the switching of WG 31 to the inactive state. Further, when WG 47 is active, the degauss control circuit 213 outputs, to the degauss write driver 215, WD 46 contained in WD 38 and corresponding to the remaining data of the postamble 115. In this modification, DG 40 is always kept inactive, which differs from the second modification. Whether the degauss control circuit 213 should switch WG 47 to the active state as in the third modification, or switch DG 40 to the active state as in the second modification can be designated by sending a command from the CPU 24 to the circuit 213 via the HDC 23 and AMP_CTL 30.

In the third modification, when WG 45 is active, data corresponding to the area ranging from the start of the write data section 116 to some portion of the postamble 115 of the write data section 116 is recorded in accordance with WS 44 generated from WD 42 by the data write driver 212. In contrast, when WG 45 is switched to the inactive state and WG 47 is switched to the active state, data is recorded in the following manner. Namely, data corresponding to the area ranging from some portion to the end of the postamble 115 of the write data section 116 is recorded as the data of the degauss section 117 in accordance with WS 44 generated from WD 46 by the degauss write driver 215.

The recording frequency of the postamble 115 is set constant from the start to the end of the preamble, regardless of whether the degauss section 117 is included, which differs from the second modification. However, Tr 101A and Tf 101B of WS 44, which is generated from WD 46 by the degauss write driver 215 and used for recording data corresponding to the degauss section 117, are set longer than Tr 101A and Tf 100B of WS 44 generated by the data write driver 212, as in the embodiment and first modification. This being so, the residual magnetism of the head 12 can be efficiently eliminated without using a special data signal (DS 41) for recording data corresponding to the degauss section 117. Moreover, as in the second modification, it is not necessary to add the degauss section 117 that is independent of the write data section 116. Accordingly, the third modification also enhances the formatting efficiency of the disk 11. It is apparent that the third modification does not always require the degauss signal generator 214.

FOURTH MODIFICATION

Figure 9:
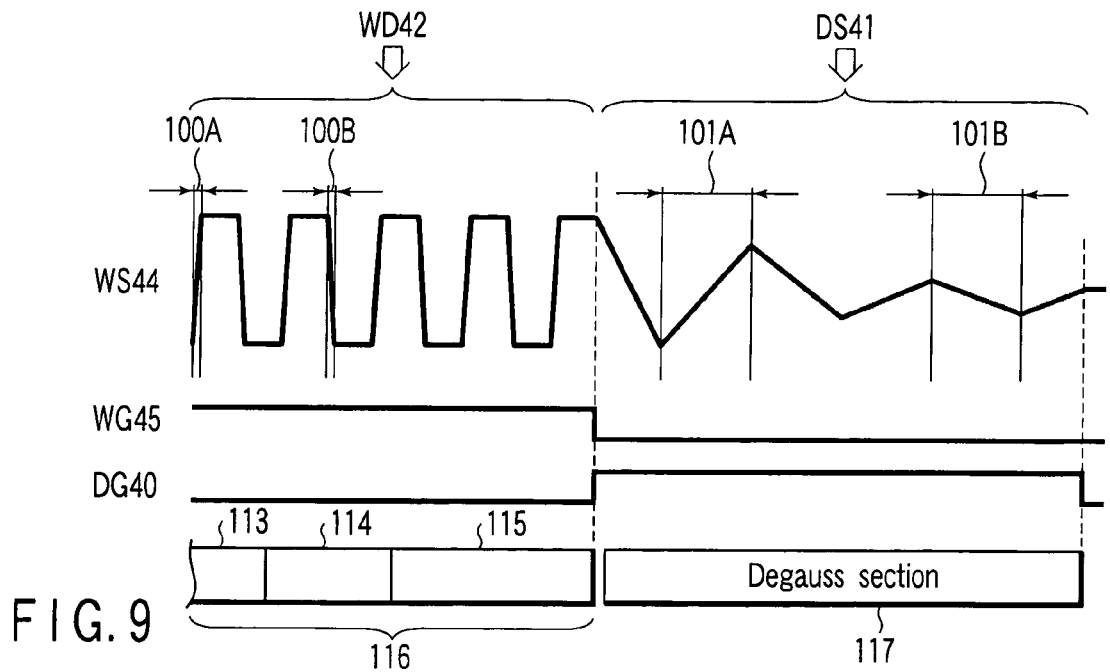
FIG. 9 is a timing chart illustrating, in relation to a data format, the relationship between WS 44, WG 45 and DG 40 in a fourth modification of the embodiment.

Referring to FIG. 9, a fourth modification of the embodiment will be described. FIG. 9 is a timing chart similar to FIG. 6, in which the relationship between WS 44, WG 45 and DG 40 is shown in relation to a data format. The fourth modification is characterized in that the wave of WS 44 generated by the degauss write driver 215 when DG 40 is active is not a square wave but a triangular wave. In this case, even if the frequency of WS 44 when DG 40 is active is equal to that in, for example, the first modification (see FIG. 6), Tr 101A and Tf 101B of WS 44 can be made longer than in the first modification, as is apparent from FIG. 9. As a result, the residual magnetism of the head 12 can be further efficiently eliminated.

FIFTH EMBODIMENT

Referring to FIG. 10, a fifth modification of the embodiment will be described. FIG. 10 is a timing chart similar to FIG. 6, in which the relationship between WS 44, WG 45 and DG 40 is shown in relation to a data format. The fourth modification is characterized in that the wave of WS 44 generated by the degauss write driver 215 when DG 40 is active is not a square wave but a sine wave. In this case, even if the frequency of WS 44 when DG 40 is active is equal to that in, for example, the first modification (see FIG. 6), Tr 101A and Tf 101B of WS 44 can be made longer than in the first modification, as is apparent from FIG. 10. As a result, the residual magnetism of the head 12 can be further efficiently eliminated. Moreover, WS 44 of a sine wave can have minimum rising/falling inclinations, and can minimize the overshoot level. This means that the occurrence itself of the residual magnetism can be suppressed.

In general, in the data-recording mode, to secure a recording current sufficient to reliably record data by the recording head, the recording current is intentionally overshoot. However, in the degaussing mode in which DG 40 is active, it is not necessary to intentionally overshoot the recording current. In light of this, even where a square wave is used for WS 44 as in the embodiment and the first to third modification, if the degauss write driver 215 reduces the overshoot level of WS 44 in the degaussing mode in which DG 40 is active, the degaussing efficiency can be better enhanced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head amplifier circuit for use in a hard disk drive having a recording head which magnetically records data on a magnetic disk medium, comprising:

a driver circuit configured to supply, in a data-recording mode, the recording head with a recording current corresponding to write data and serving as a first recording current, and to supply, in a degaussing mode, the recording head with a degaussing current serving as a second recording current, the second recording current being a recording current of a square wave which has a rising period and a falling period set longer than a rising period and a falling period of the first recording current; and a control circuit configured to control switching from the data-recording mode to the degaussing mode to control the driver circuit, wherein:

write data of one sector recorded to the magnetic disk medium by the recording head includes user data and a postamble that forms a rear end of the write data; and the control circuit switches the driver circuit from the data-recording mode to the degaussing mode while part of the postamble is recorded on the magnetic disk medium, thereby controlling the recording of the remaining part of the postamble on the magnetic disk medium by the magnetic recording head, based on the degaussing current generated by the driver circuit.

2. The head amplifier circuit according to claim 1, wherein in the degaussing mode, the driver circuit generates, as the degaussing current, a recording current corresponding to the remaining part of the postamble.

* * * * *